United States Patent [19]

Essom et al.

[11] Patent Number: 4,973,209
[45] Date of Patent: Nov. 27, 1990

[54] SCREW FOR CONTAMINATED PRE-TAPPED HOLES

[75] Inventors: Charles J. Essom, Walsall; Ernest W. Billingham, Birmingham, both of United Kingdom

[73] Assignee: Conti Fasteners AG, Zug, Switzerland

[21] Appl. No.: 716,853

[22] Filed: Mar. 28, 1985

[51] Int. Cl.⁵ .............................................. F16B 25/00
[52] U.S. Cl. ..................................... 411/386; 411/308; 411/387; 411/416; 411/417
[58] Field of Search ................................ 411/308–311, 411/411–412, 416–417, 423, 428, 386, 387; 10/10 R

[56] References Cited

U.S. PATENT DOCUMENTS

| | | | |
|---|---|---|---|
| 1,451,484 | 4/1923 | Woodward | 411/311 |
| 1,909,476 | 5/1933 | Trotter | 411/386 |
| 2,136,458 | 11/1938 | Olson | 411/417 |
| 2,140,467 | 12/1938 | Cargile | 411/417 |
| 2,829,696 | 4/1958 | Wagner | 411/386 |
| 3,076,208 | 2/1963 | Moore | 411/311 |
| 3,239,710 | 3/1966 | Toporzysek | 411/417 |
| 3,426,820 | 2/1969 | Phipard, Jr. | 411/310 |
| 3,504,722 | 4/1970 | Breed | 10/10 R |
| 3,878,759 | 4/1975 | Carlson | 411/416 |
| 4,315,340 | 2/1982 | Veldman | 411/416 |
| 4,368,552 | 1/1983 | Sugiyama | 10/10 R |

FOREIGN PATENT DOCUMENTS

| | | | |
|---|---|---|---|
| 2457683 | 6/1976 | Fed. Rep. of Germany | 411/417 |
| 628857 | 6/1963 | France | 411/417 |
| 1556730 | 2/1969 | France | 411/416 |

Primary Examiner—Gary L. Smith
Assistant Examiner—Suzanne L. Dino
Attorney, Agent, or Firm—Richard R. Trexler

[57] ABSTRACT

A locking screw having a head at one end, a special entry portion at the other end, and a trilobular shank portion extending from the entry portion toward the head. The screw is further characterized in that the thread profile is of a double angle configuration symmetrical about an axis perpendicular to the longitudinal axis of the screw. The entry section is tapered and is formed with a series of truncations which serve to clear progressively a contaminating coating in an internally threaded workpiece, such as a nut, when the screw is threaded therein.

8 Claims, 2 Drawing Sheets

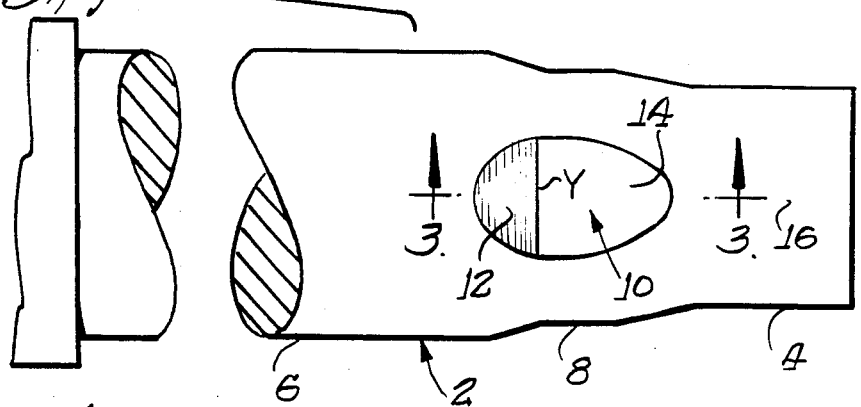
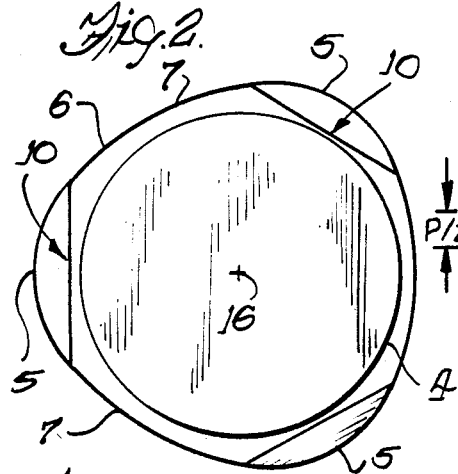
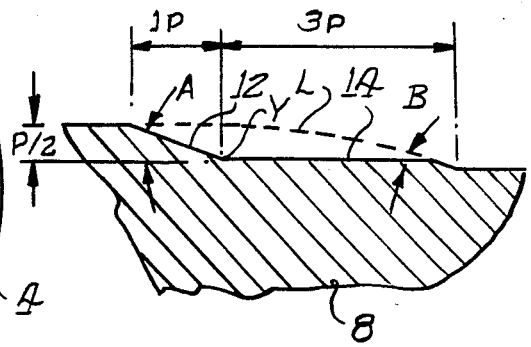
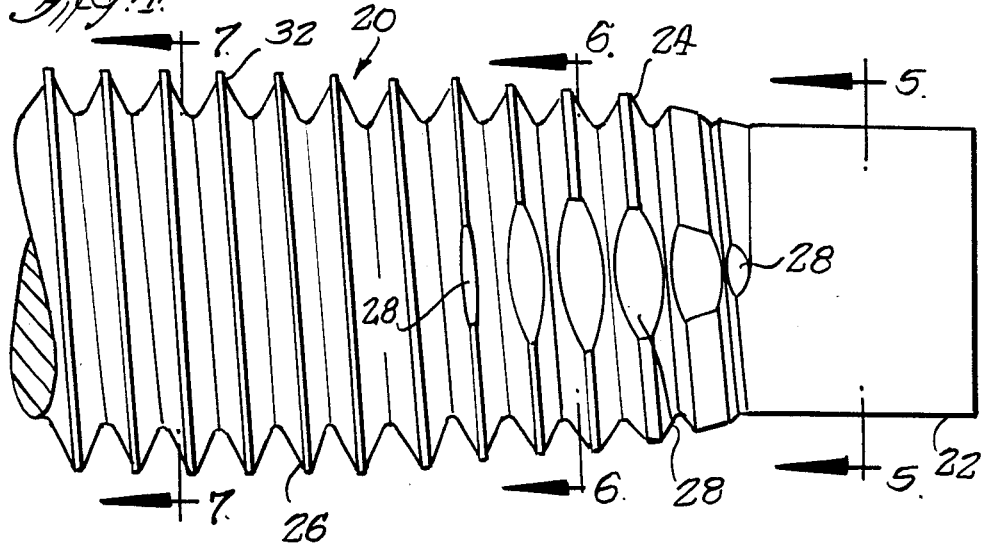

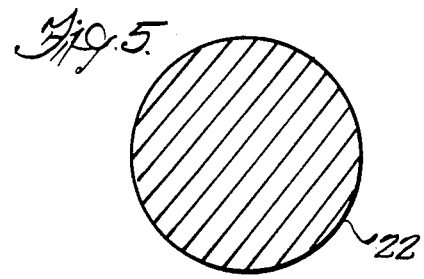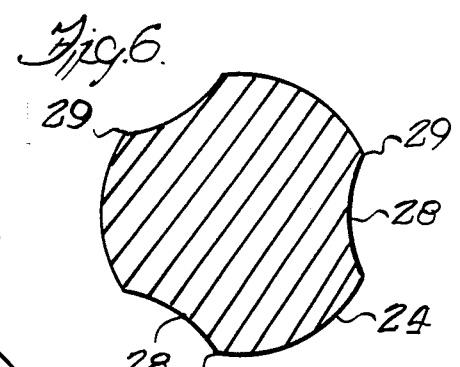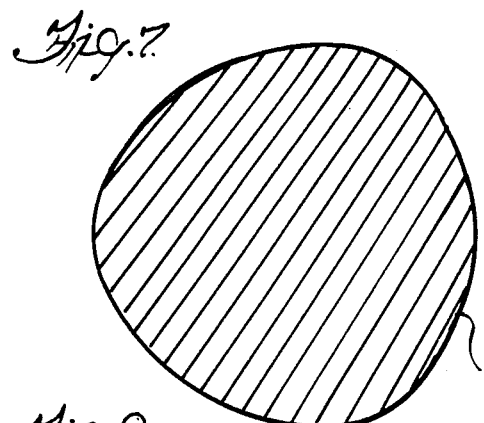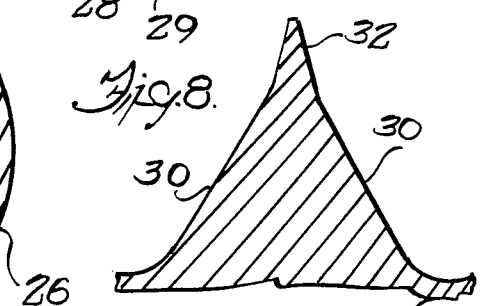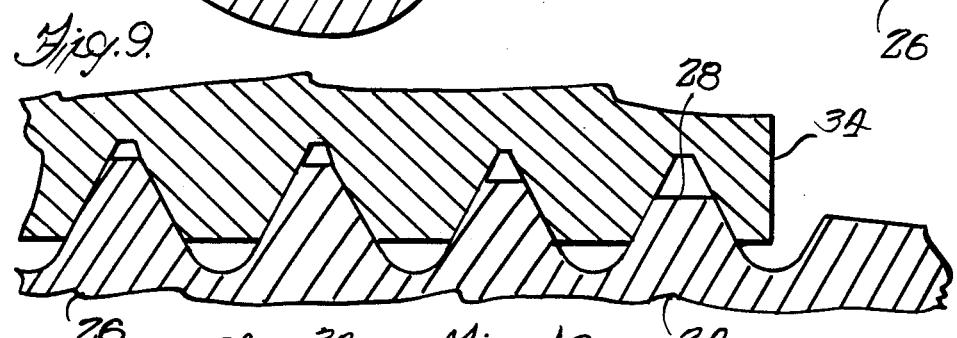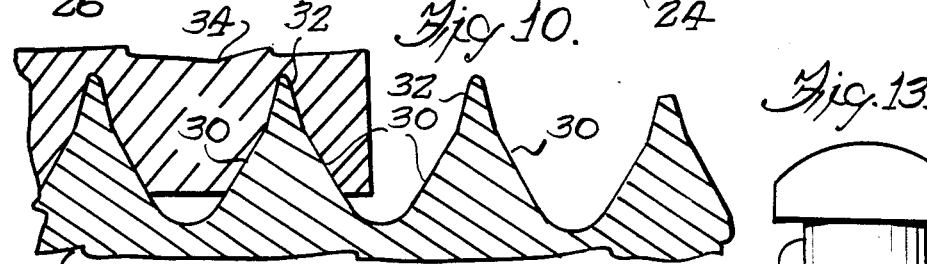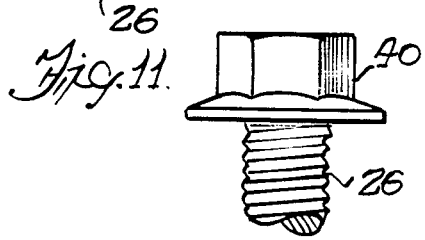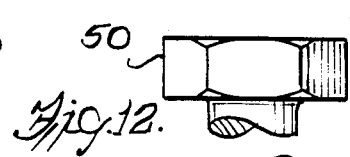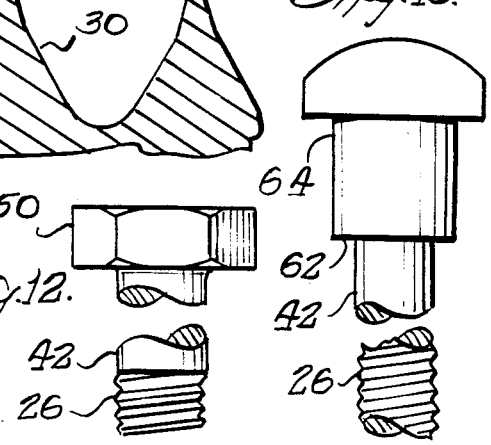

SCREW FOR CONTAMINATED PRE-TAPPED HOLES

BACKGROUND OF THE INVENTION

This invention relates generally to locking screws, and more particularly to a screw for use with a pre-tapped mating nut or other threaded hole and wherein good resistance to vibrational loosening is required.

The present invention is particularly applicable to a screw for use with a pre-tapped nut or like threaded member and wherein the pre-tapped thread is likely to be partially coated with paint or other contaminants. Permanently attached nuts on automobiles or other vehicles or tapped holes for containers are typical examples of the pre-tapped threads which are likely to be contaminated and with which the screw of the present invention is intended to be used.

Various types of screws are known for use with pre-tapped holes. Generally speaking those screws have a substantially circular cross-section and are free running provided the nut threads are clean. If resistance to vibrational loosening is required these screws of circular cross-sections can be modified by the addition of plastic (such as nylon) or other non-metallic patches over a portion of their length. If the pre-tapped nut or female thread is contaminated with paint or other hardened material, difficulty is sometimes encountered in using screws of the type which are of a circular cross-section with or without the addition of non-metallic or plastic patches.

Another known type of screw for use with a pre-tapped hole has a trilobular cross-section but wherein the thread includes a double angle profile. In this type of thread profile the flanks of the thread from the root of the thread outwardly past the pitch circle are at the normal flank angle. However, at the crest portion of the thread the flank angle is reduced which causes an interference between the thread on the screw and the thread in the hole. For example, in one known arrangement the flanks are at the normal 60 degree angle from the root of the thread outwardly a certain distance past the pitch circle, but at the crest region on of the thread, the flank angle is about 30 degrees. In a trilobular screw of the type having the 60 degree-30 degree double angle profile the screw creates a resistance to vibrational loosening.

Also known are several types of screws designed for removing female thread contamination as they are inserted. However, none of these screws are intended to provide a locking arrangement which resists vibrational loosening. In another known arrangement an otherwise known trilobular screw was modified by having its entry portion almost triangular in configuration. It was intended that the triangular entry portion would create a scraping effect while at the same time providing a clearance space for contaminants scraped off of the female thread. Such an arrangement was found to be successful in cases where there were small amounts of fairly soft contamination material. In recent years, however, automobile paints have become much harder and much thicker in order to protect the vehicle against corrosion. Where the threaded hole is contaminated by such coatings and a locking screw of the double angle type is used, the extra surface pressures generated by the hard contaminants can cause excessive and objectionable noise levels as the screws are driven into the contaminated holes. Moreover, the contaminant adversely effects the torque-tension relationships in driving the screw into the hole, and in extreme cases might possibly cause failure of the screw.

OBJECTS AND SUMMARY OF THE INVENTION

An object of this invention is to provide an improved screw for the use stated and which will eliminate or significantly reduce the installation noise levels.

It is a further object of this invention to provide a screw of the type stated that maintains a more constant torque-tension relationship while threading the screw into the workpiece.

It is yet another object of this invention to provide a screw of the type stated which will retain substantial vibration resistance when threaded into place even when the mating female threads are sufficiently contaminated by thick hard paint and like extraneous coatings.

In accordance with the invention there is provided a hardened steel screw, having a head at one end, a three-part entry portion at the other end, and a trilobular threaded shank portion between the head and the entry portion and extending from the entry portion toward the head. The threaded shank portion is characterized by a double-angle profile of the thread which is symmetrical about an axis perpendicular to the longitudinal axis of the screw, and by a helix angle equal to that of conventional circular-section machine screws. The threaded shank portion may extend from the entry portion to a position closely adjacent to the underside of the head, or it may terminate short of the head to provide an unthreaded shank portion of smaller diameter than the thread crest. Alternative features to the smaller diameter shank include a full diameter shank, equal to or slightly greater than the nominal screw diameter, and a spacing collar substantially larger than the nominal screw diameter. Furthermore, there could be a combination of such features, which may or may not be circular in cross-section.

There is preferably a single start thread which is raised slowly from the entry portion of the screw to the full diameter or load bearing thread diameter. Generally, the entry portion will comprise a circular section with a diameter approximately 75% to 80% of the nominal screw diameter. The circular section blends into a truncated crest trilobular tapered section in which the truncation varies through several thread turns from a maximum to zero, although not necessarily at a constant rate. The truncated section in turn eventually blends into a fully trilobular tapered section. Finally, the fully trilobular tapered section blends into a fully trilobular load bearing thread. By way of example but not of limitation, the overall length of the entry portion may be 2.5 to 3 times the nominal screw diameter. The taper of the tapered section may vary from about 15 degrees at the small end to about 5 degrees at the large end. The truncations provide for a progressive clearing action of the hard contaminated coating with the progressive action beginning at the tip of the thread and increasing as the tapered screw is inserted into the mating thread. Further clearing takes place as the screw is inserted further into the mating thread until the full diameter body portion of the screw is in the mating thread. The truncations or cut-outs, as they may be called, provide diametral clearance between the screw and the mating thread to collect debris (such as paint chips), removed by the clearing action.

Also in accordance with the present invention, the truncations are spaced longitudinally from the shank section.

Further in accordance with the present invention there is provided a locking screw having an elongated shank section with a central axis, said shank section having a thread with opposed flanks that comprise radially inner and outer portions, said inner portion having flanks each at a first angle to a line perpendicular to said axis and said outer portion having flanks at the thread crest, and each outer portion flank being at a second angle to said line, said second angle being smaller than said first angle, and a tip section at which the screw is initially inserted into a pre-tapped hole in which the thread is contaminated by a coating thereon; characterized by a tapered entry section intermediate said shank section and said tip section, said entry section comprising a thread with a lobular cross-sectional shape having circumferentially spaced lobes separated by intermediate arcuate sides, said entry section thread also being a continuation of the thread in said shank section and having truncations, said truncations forming indentations radially inwardly from the thread crest and with radial outer crest portions of the indentations constituting elements for engaging the coating and providing progressive action means commencing at the smaller end of the tapered entry section for clearing contaminating coating from said pre-tapped hole thread as the shank is threaded into said pre-tapped hole.

A further object of this invention is to provide the combination of a locking screw and a pre-tapped nut or threaded hole having the advantages as aforesaid.

A still further object of this invention is to provide a novel screw blank which can be thereafter rolled in threading dies to form the screw of the present invention.

BRIEF DESCRIPTION OF THE FIGURES

FIG. 1 is a fragmentary elevational view of a screw blank constructed in accordance with and embodying the present invention;

FIG. 2 is an end elevational view as seen from the right hand side of FIG. 1;

FIG. 3 is an enlarged fragmentary sectional view taken along line 3—3 of FIG. 1;

FIG. 4 is a fragmentary elevational view of a roll-threaded screw formed in accordance with the present invention;

FIGS. 5, 6 and 7 are sectional views taken along lines 5—5, 6—6, and 7—7 respectively of FIG. 4;

FIG. 8 is an enlarged sectional view of a thread showing the thread profile in the load bearing or shank section of the screw;

FIG. 9 is a fragmentary sectional view showing a partially assembled screw and mating nut or other structure having a pre-tapped hole;

FIG. 10 is a fragmentary sectional view showing the screw fully assembled with the nut or other device having the pre-tapped hole; and FIG. 11, 12 and 13 show screws with various underhead features which may be utilized in connection with the present invention.

DETAILED DESCRIPTION

Referring now in more detail to the drawings there is shown a metal elongated blank 2, usually of low carbon steel, which is cropped from drawn lobular wire stock and then cold headed and otherwise reshaped in a desired manner. The blank 2 has a tip section 4 and remote therefrom a lobular shank section 6 corresponding to the general diameter of the headed blank. The lobular form on the shank section 6 may be of a known configuration, for example a trilobular form of uniform width throughout 360 degrees and having circumferentially spaced lobes 5 separated by arcuate sides 7 of longer radius than the radius of the lobes 5. A shank section 6 with a greater or lesser number of lobes may also be used. At one end of the shank section 6 is a conventional head 19.

Intermediate the cylindrical dog point or tip section 4 and the shank section 6 is an intermediate lobular section 8 which is generally tapered from the shank section 6 toward the tip section 4 and includes novel cutaways or surface regions 10. These surface regions 10 may be respectively aligned with the lobes 5 and may include adjacent surfaces 12, 14 which are generally planar and intersect along a line Y to form an obtuse angle. The line Y lies in a plane which is perpendicular to the central axis 16 of the screw blank. By way of example the angle of taper at the leading end of the surface 14, namely that end of the surface 14 adjacent to the tip section 4, is at a small angle B which may be of the order of 15 degrees. Furthermore, the angle A formed by the extension of the plane of the surface 14 with the surface 16 is approximately 10 degrees. The length of the surface 14, measured in a direction longitudinally of the blank, is approximately 3 pitches whereas the corresponding length of the surface 12 is approximately 1 pitch. The radial exent of the outer surface of the shank section 6 beyond the surface 14 is approximately ½ pitch, all as best shown in FIG. 3. The broken line L shows the normal configuration of a tapered lobular blank which does not include the cutaway regions 10. Also, as noted in FIGS. 1 and 3, the transverse dimension, i.e., the dimension parallel to the line Y of each surface 12, 14 decreases in a direction away from the line Y whereby the surface 14 is narrowest adjacent to the tip section 4 whereas the surface 12 is narrowest adjacent to the shank section 6. These novel cutaway portions 10 are utilized to form truncations in the finished screw, as will be hereinafter described.

The blank 2 is roll threaded in a known manner to provide the screw shown in FIGS. 4-10. During the rolling action the blank is shaped to form a screw 20 with a cylindrical point or tip section 22, a tapered lobular truncated entry section 24, and a full width non-tapered lobular shank section 26, the later containing the holding or load bearing thread of the screw. The rolling action induces a taper in the lobular truncated section 24, the taper being toward the cylindrical point 22, and approaching the point 22 at an angle of approximately 15 degrees. The taper merges smoothly at a near zero degree angle at the junction of the section 24 and the section 26.

As best seen in FIGS. 4 and 9 there is a tapered thread section, intermediate the truncations 28 and the shank section 26, made up by the longitudinal end part (e.g., a thread turn or two - See FIG. 4) of the truncated entry portion 25 that is remote from the tip section 22. Alternatively, if desired, the tapered entry portion may merge with the shank section 26 approximately where the truncations end.

The rolling action of the dies results in a series of truncations 28 which extend over the first 4 to 6 pitches (approximately) and with the truncations being slightly indented as best shown in FIG. 6. These indentations form radially outer thread crest portions 29 which, when the screw is threaded into a mating thread, serve to clear progressively contaminated material in the mating thread.

Referring to FIG. 4 the truncations 28 are relatively small in circumferential extent adjacent to the point 22. In the direction from the point 22 toward the full width shank section 26 the truncations 28 increase progressively in width and circumferential extent up to a maximum and then decrease until the full thread section 26 is reached.

The thread on the shank section 26 is fully developed and has a profile shown in enlargement in FIG. 8. This thread is of a double angle form symmetrical about an axis perpendicular to the longitudinal axis of the screw. By way of example but not of limitation, the flanks 30, 30 of the thread may be at a conventional 60 degree angle from the root of the thread radially outwardly beyond the pitch circle but with the portion 32 of the thread at the crest region being at about 30 degrees to form an interference fit with a conventional nut 34 or threaded hole formed with an internal thread with flank angles of 60 degrees. As will be apparent the thread turns in the tapered lobular section 24 have substantially no developed 30 degree crest portion at those thread turns near the point 22; however, the crest portion becomes more fully developed as the thread turn approaches and merges with the full width shank portion 26.

FIG. 9 shows the screw 20 threaded partially into a workpiece 34, which may be a nut, threaded hole, or the like. During the threading action the truncations serve to remove hardened contaminated coating from the internal thread on the workpiece 34. At the same time the presence of the novel truncations tends to reduce installation noise level and maintains a more consistent torque-tension relationship during installation of the screw. Moreover, the interference fit between the crest portions 32 of the screw thread and the normal thread configuration of the nut 34 provides a locking action which resist vibrational loosening of the screw.

FIGS. 11, 12 and 13 show different applications of the invention. In FIG. 11 the thread on the shank section 26 extends up to the screw head 40. In FIG. 12 the screw shown has an unthreaded portion 42 between the threaded portion or shank 26 and the head 50. The diameter of the unthreaded portion 42 is less than the crest diameter of the threaded portion 26. However, the unthreaded portion 42 may be substantially equal in diameter or width to the crest diameter of the section 26 or it may be greater than the same. Moreover, the unthreaded section 42 may be of other cross-sectional shapes, for instance circular. In FIG. 13 the screw is similar to that of FIG. 12 except that an enlarged cylindrical section 60 is formed beneath the head to provide a shoulder 62.

The invention is claimed is follows:

1. A locking screw having an elongated shank section with a central axis, said shank section having a roll formed thread with opposed flanks that comprise radially inner and outer portions, said inner portion having flanks each at a first angle to a line perpendicular to said axis and said outer portion having flanks at the thread crest and each outer portion flank being at a second angle to said line, said second angle being smaller than said first angle, and a tip section at which the screw is initially inserted into a pre-tapped hole in which the thread is contaminated by a coating thereon; characterized by a tapered entry portion intermediate said shank section and said tip section, said entry portion comprising a thread with a lobular cross-sectional shape having circumferentially spaced lobes separated by intermediate arcuate sides, said tapered entry portion thread having been roll formed from a screw blank having a central axis and a surface region, said region comprising a pair of generally planar surfaces forming an obtuse angle to each other and which intersect along a line that lies in a plane that is perpendicular to said central axis, said entry portion thread also being a continuation of thread in said shank section and having truncations, said truncations forming indentations radially inwardly from the thread crests and with radial outer crest portions of the indentations constituting elements for engaging the coating and providing progressive action means commencing at the smaller end of the tapered entry portion for clearing contaminating coating from said pre-tapped hole.

2. A locking screw according to claim 1 further characterized in that said truncations increase in circumferential extent from said tip section through a part of the length of the entry portion and in the direction toward said shank section, and then the truncations decrease in circumferential extent through the adjacent part of said entry portion in the direction toward said shank section.

3. A locking screw according to claim 1 further characterized in that truncations are spaced longitudinally from said shank section, and longitudinally intermediate said truncations and said shank section there is a thread section tapered toward said tip section and of lobular cross-section having circumferentially spaced lobes separated by intermediate arcuate sides, said tapered thread section having a substantial fully developed thread at said lobes.

4. A locking screw according to claim 1 further characterized in that the length of the entry portion is about 2.5 to 3.0 times the nominal screw diameter.

5. A locking screw according to claim 1 further characterized in that the entry portion is tapered toward said tip section and merges with shank section where the thread in said entry section is substantially fully developed at its lobes.

6. A locking screw according to claim 2 further characterized in that said truncations are spaced longitudinally from said shank section.

7. In combination with a member having a pre-tapped hole in which the thread is contaminated by a coating, a locking screw having an elongated shank section with a central axis, said shank section having a thread with opposed flanks that comprise radially inner and outer portions, said inner portion having flanks each at a first angle to a line perpendicular to said axis and said outer portion having flanks at the thread crest and each outer portion flank being at a second angle to said line, said second angle being smaller than said first angle, and a tip section on said screw and at which the screw is initially threaded into said contamination thread in said pre-tapped hole characterized by a tapered entry portion intermediate said shank section and said tip section, said entry portion comprising a thread with a lobular cross-sectional shape having circumferentially spaced lobes separated by intermediate arcuate sides, said entry portion thread also being a continuation of the thread in said shank section and having truncations, said truncation forming indentations radially inwardly from the thread crests and with radial outer crest portions of the indentations constituting elements for engaging the coating and providing progressive action means commencing at the smaller end of the tapered entry portion for clearing contaminating coating from said pre-tapped hole thread as the shank is threaded into said pre-tapped hole.

8. A combination according to claim 7 in which said truncations increase in circumferential extent from said tip section through a part of the length of said entry section and in a direction toward said shank section, and then the truncations decrease in circumferential extent through the adjacent part of said entry section in the direction toward said shank section.

* * * * *